Dec. 8, 1970 J. A. KONOTCHICK, JR 3,546,599

APPARATUS FOR SEPARATING SIGNALS HAVING A COMMON PULSE REPETITION FREQUENCY

Filed Jan. 10, 1968 4 Sheets-Sheet 1

INVENTOR
JOHN A. KONOTCHICK, JR.

BY Richard J. Seligman

ATTORNEY

INVENTOR
JOHN A. KONOTCHICK, JR.

BY Richard S. Seligman

ATTORNEY

INVENTOR
JOHN A. KONOTCHICK, JR.

BY Richard J. Seligman

ATTORNEY

INVENTOR
JOHN A. KONOTCHICK, JR.
BY Richard J. Seligman
ATTORNEY

United States Patent Office 3,546,599
Patented Dec. 8, 1970

3,546,599

APPARATUS FOR SEPARATING SIGNALS HAVING A COMMON PULSE REPETITION FREQUENCY

John A. Konotchick, Jr., Hudson, N.H., assignor to Sanders Associates, Inc., Nashua, N.H., a corporation of Delaware Filed Jan. 10, 1968, Ser. No. 696,886
Int. Cl. H03k *17/02, 5/18, 5/20*
U.S. Cl. 328—105 14 Claims

ABSTRACT OF THE DISCLOSURE

Apparatus for sorting pulse trains of common PRF according to time of arrival of the pulses includes a series of sorting channels comprising flip-flops, diode gates and logic circuitry for selectively applying first pulses of the pulse trains to be sorted to one of a number of outputs. Subsequent pulses bypass the sorting channels and are more directly applied to said outputs. The sorting channels are bypassed by inhibiting an "inhibited OR" gate preceding the sorting chains.

The invention herein described was made in the course of or under a contract or subcontract thereunder with the Department of the Navy.

BACKGROUND OF THE INVENTION

In many varied applications it is necessary to separate electromagnetic signals having identical pulse repetition frequencies (PRF's). Some of the applications are radar systems and ECM (electronic countermeasures) systems. It is often necessary to separate signals from many radars operating with the same PRF and obtain information from the signals or operate on them for an ECM technique. Presently there is no good method of performing this separation.

SUMMARY OF THE INVENTION

The present invention comprehends a system for separating pulse train signals having identical pulse repetition frequencies (PRF's).

In one embodiment, the first received pulse of pulse trains having a common PRF but variable time position are applied to channels, selected in accordance with said variable time position. These pulses are applied via an "inhibited OR" gate and a delay to the selected sorting channels. The pulses are separated in accordance with their time position. When subsequent pulses of the pulse trains are received the "inhibited OR" gate, delay and sorting channels are bypassed and these pulses are more directly coupled to their respective outputs. The "inhibited OR" gate is inhibited for subsequent pulses of pulse trains having the predetermined PRI.

Accordingly, it is an object of this invention to provide a pulse train sorter.

It is another object of this invention to provide apparatus for sorting pulse trains of common PRF.

It is a further object of this invention to provide apparatus for sorting pulse trains of common PRF by separating the pulses on the basis of their time of arrival.

BRIEF DESCRIPTION OF THE DRAWINGS

The above-mentioned and other features and objects of this invention will become more apparent by reference to the following description taken in conjunction with the accompanying drawings, in which.

DESCRIPTION OF PREFERRED EMBODIMENTS

Figures 1, 2:
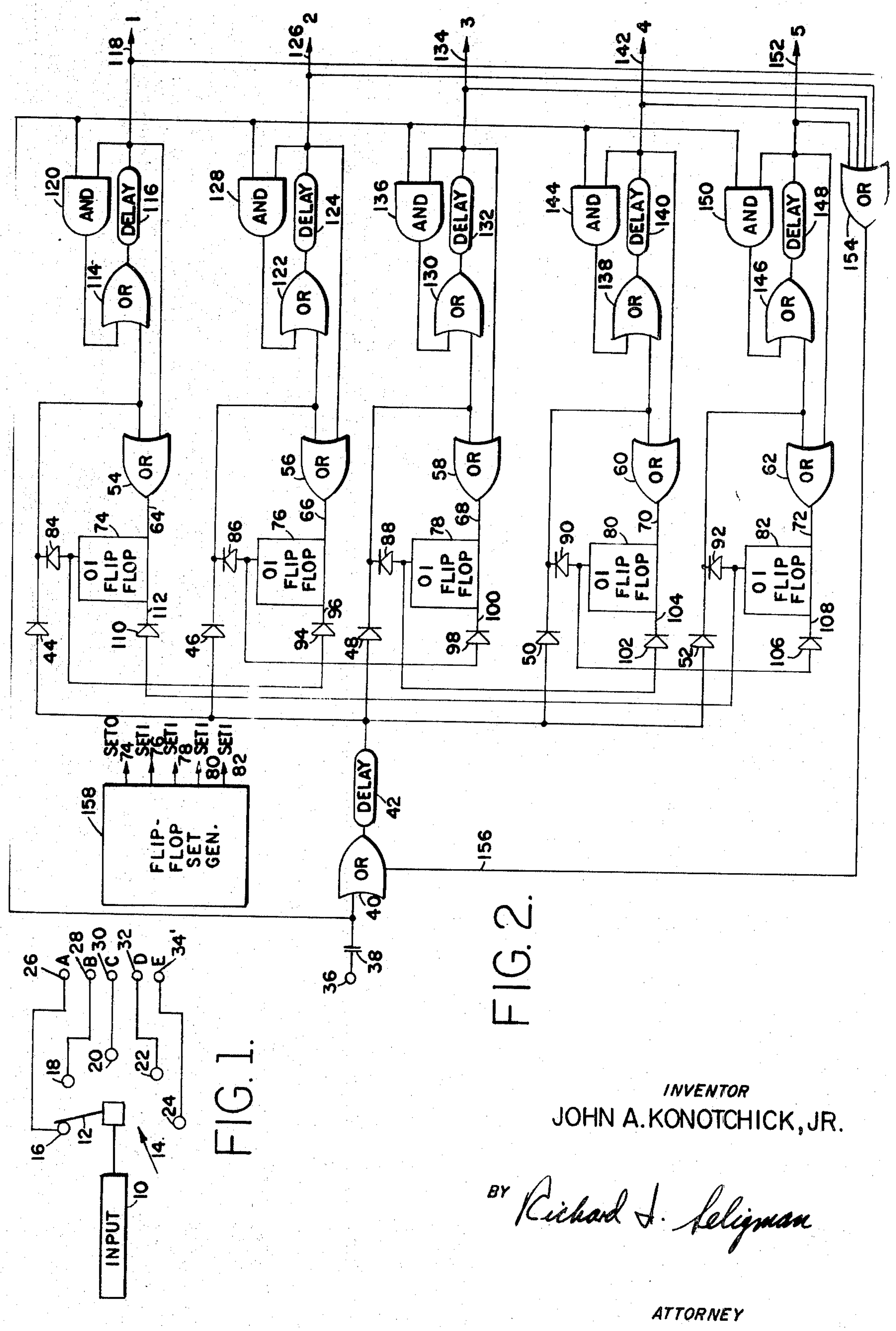
FIG. 1 is a simplified block diagram illustrated diagrammatically the theory behind the invention.
FIG. 2 is a block diagram of one embodiment of the invention.

Referring now to FIG. 1 there is illustrated thereby a simplified block diagram of a pulse train sorter. This figure illustrates diagrammatically the theory behind this invention. The input to the apparatus are pulse trains having a constant pulse repetition frequency (PRF). All incoming signals can be initially processed to separate the signals according to their PRF. One such device for performing this separation is the digital PRF filter described in my co-pending patent application for "Pulse Train Detectors," Ser. No. 688,714, filed Dec. 7, 1967.

The input signal comprising pulse trains of a constant PRF is applied at an input 10. The input 10 is coupled to wiper 12 of a switch 14 having a plurality of contacts 16, 18, 20, 22, 24 connected to a plurality of bins 26, 28, 30, 32, and 34.

If the wiper arm 12 is originally on contact 16, the first incoming pulse will go to bin 26; the switch will then automatically step to the next position 18. The second pulse in (in less than 1/PRF) will go to bin 28 and again the switch will advance. If no more pulses arrive by the time of a pulse interval for the PRF (i.e., its PRI) the switch will automatically return to position 16. At one PRI after the second pulse came in it will now go to switch position 18 etc. If a new pulse train comes in it will go to the next empty register 30.

In this manner pulse trains of constant PRF are separated.

Mechanical switches, of course, are limited in speed, size, contact, life etc., so in practice a better means is required for switching.

Referring now to FIG. 2, there is illustrated thereby a block diagram of a logic circuit for separating signals having the same PRF.

The pulse train sorter comprises an input 36 at which pulse trains of constant PRF are applied. The input signals are coupled via a capacitor 38 to an "inhibited OR" gate 40. The output from "inhibited OR" gate 40 is applied via a delay 42 to a series of diode gates 44, 46, 48, 50, and 52.

Figure 3:
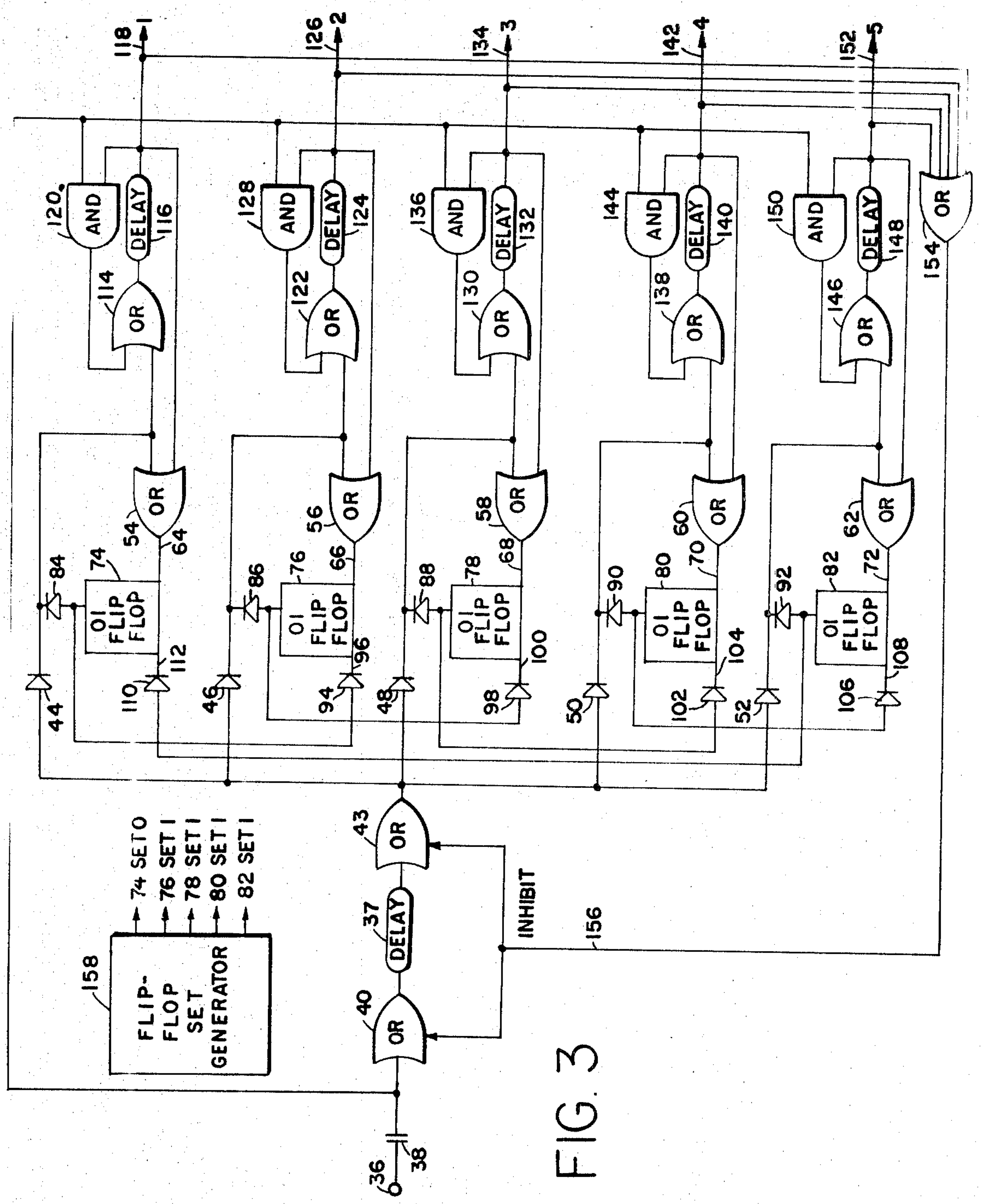
FIGS. 3–5 are block diagrams illustrating alternate embodiments of the invention.
Figure 4:
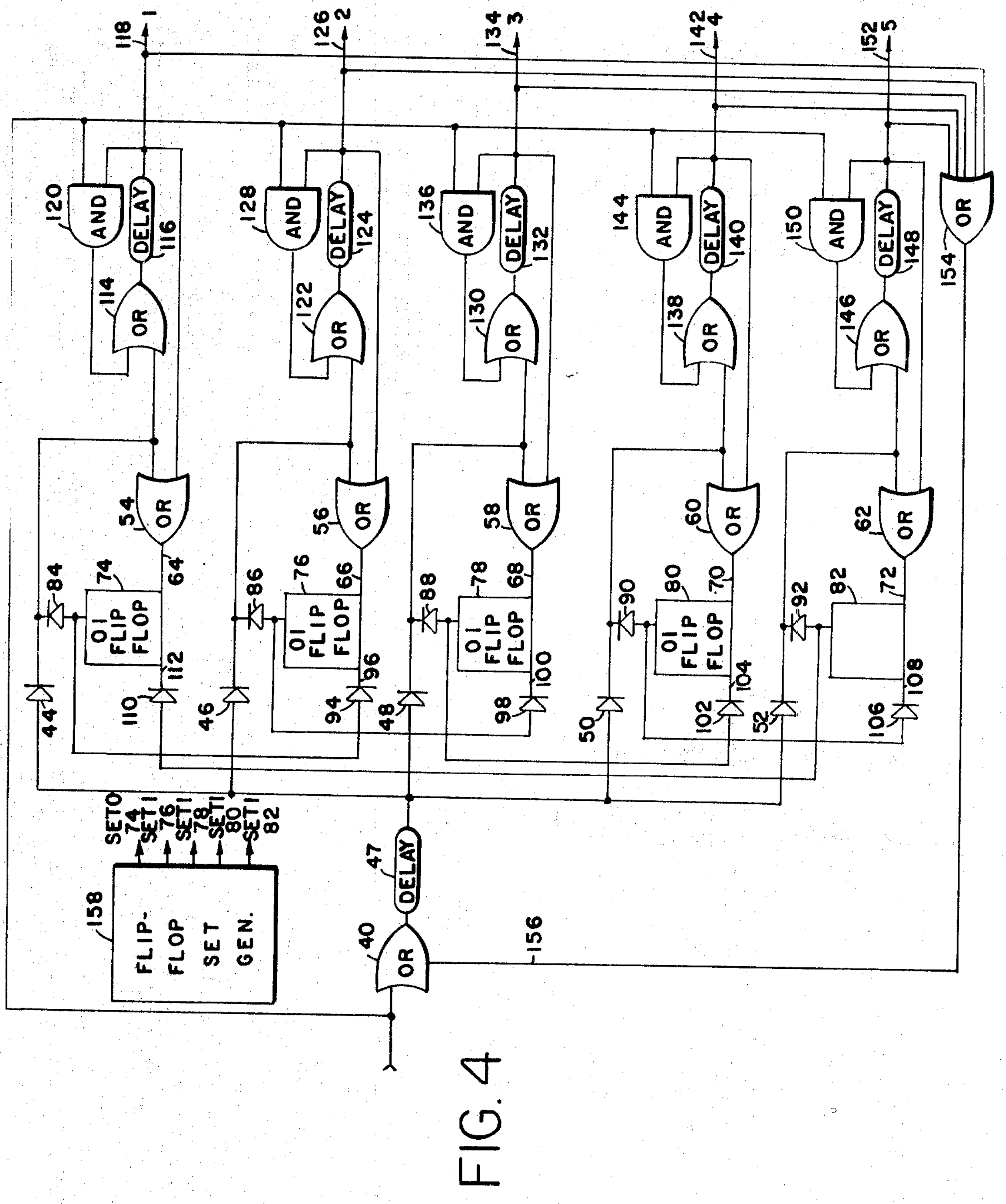

The delay element 42 is made such that only one pulse at a time can be present within the delay and such that a second pulse one PRI later will not enter the delay. In the preferred embodiment of the invention a monostable multivibrator with finite recovery time is used. The on-time of the monostable multivibrator is equal to the PRI and the finite recovery time is selected such that the monostable multivibrator will not trigger on the second pulse of a train. However, FIGS. 3 and 4 show alternate schemes which permit any type of delay to be used. If a possibility of more pulse trains than the number of channels exists, then the modification illustrated in FIG. 5 must be employed.

Diode gates 44, 46, 48, 50, and 52 are coupled to a plurality of "OR" gates 54, 56, 58, 60, and 62, respectively, as first inputs thereto. The outputs from "OR" gates 54, 56, 58, 60, and 62 are coupled to the set one lines 64, 66, 68, 70, and 72, respectively of a plurality of bistable devices 74, 76, 78, 80, and 82, respectively. In the instant exmaple the bistable devices are bistable multivibrators or flip-flops but this is exemplary only. The output from flip-flops 74, 76, 78, 80, and 82 are coupled via a series of unidirectional devices 84, 86, 88, 90, and 92, respectively, to the outputs of said diode gates 44 through 52, respectively.

The output from the flip-flop 74 is also coupled via a diode 94 to the set zero line 96 of flip-flop 76. The output from flip-flop 76 is also coupled via a diode 98 to the set zero line 100 of flip-flop 78. The output from flip-flop 78 is also coupled via a diode 102 to the set zero line 104 of flip-flop 80. The output from flip-flop 80 is also coupled via a diode 106 to the set zero input line 108 of flip-flop 82. The output from flip-flop 82 is also coupled via a diode 110 to the set zero input 112 of flip-flop 74.

The output from diode gate 44 is also coupled to an "OR" gate 114 as a first input thereto. The output from "OR" gate 114 is coupled to a delay 116 having a delay time equal to the PRI of the pulse trains to be sorted. The output from delay 116 provides one output 118 of the pulse train sorter at which one pulse train is derived The output from delay 116 is also coupled to "OR" gate 54 as a second input thereto and to an "AND" gate 120 as a first input thereto. The output from "AND" gate 120 is coupled as a second input to "OR" gate 114.

The output from diode gate 46 is also coupled to an "OR" gate 122 as a first input thereto. The output from "OR" gate 122 is coupled to a delay 124 having a delay equal to the PRI of the pulse trains to be sorted. A second output 126 of the system is derived at the output of delay 124. The output from delay 124 is also fed to "OR" gate 56 as a second input thereto and to an "AND" gate 128 as a first input thereto. The output from "AND" gate 128 is coupled to "OR" gate 122 as a second input thereto.

The output from diode gate 48 is also coupled to an "OR" gate 130 as a first input thereto. The output from "OR" gate 130 is coupled to a delay 132 having a delay time equal to the PRI. A third output 134 of the system is derived at the output of delay 132. The output from delay 132 is also applied to "OR" gate 58 as a second input thereto and to an "AND" gate 136 as a first input thereto. The output from "AND" gate 136 is applied as a second input to "OR" gate 130.

The output from diode gate 50 is applied as a first input to an "OR" gate 138. The output from "OR" gate 138 is applied to a delay 140 having a delay time equal to the PRI and at the output from which a fourth output 142 of the system is derived. The output from delay 140 is also coupled to "OR" gate 60 as a second input thereto and to an "AND" gate 144 as a first input thereto. The output from "AND" gate 144 is applied to "OR" gate 138 as a second input thereto.

The output from diode gate 52 is applied to an "OR" gate 146 whose output is coupled to a delay 148 having a delay time equal to the PRI. The output of delay 148 is applied as a second input to "OR" gate 62 and as a first input to an "AND" gate 150 and provides a fifth output 152 of the system. The output from "AND" gate 150 is coupled to "OR" gate 146 as a second input thereto.

The capacitatively coupled input of the system is also applied to "AND" gates 120, 128, 136, 144, and 150 as second inputs thereto.

The outputs from delays 116, 124, 132, 140, and 148, are also applied as input to an "OR" gate 154 whose output is applied to the inhibit line 156 of "inhibited OR" gate 40.

The apparatus illustrated in FIG. 2 shows sorting of up to five pulse trains. Of course, this is exemplary only, and additional pulse trains could be sorted by providing additional like stages.

As description of the operation of the invention will now be set forth in conjunction with the embodiment of FIG. 2.

A flip-flop set generator 158 is coupled to the set "0" line of flip-flop 74 and to the set "1" lines of flip-flops 76, 78, 80 and 82. This can be a pulse generator or simply a D-C level generator comprising in simple form a battery and a switch.

Initially flip-flop 74 is set to the "0" state and flip-flops 76, 78, 80, and 82 are set to the "1" state by applying an output from a flip-flop set generator 158 comprising a pulse or DC level change.

The first pulse incident at input 36 is applied via capacitor 38 to "inhibited OR" gate 40. Since initially there is no signal or inhibit line 156, the input pulse signal will pass through "inhibited OR" gate 40 and start down delay 42. The delay time of delay 42 is equal to the PRI of the pulse trains to be sorted. At the instant that the first pulse leaves delay 42 a second pulse in the pulse train will arrive at the input of the delay. The delay however will not accept this second pulse since in the preferred embodiment delay 42 is a monostable multivibrator having a finite recovery time. After passing delay 42, the first pulse goes through diode gate 44, the only diode gate not biased off by having their respective flip-flops set to the "1" state, through "OR" gate 114, and starts down its respective delay line 116. This first pulse also passes through "OR" gate 54 to the set "1" line of flip-flop 74 thus setting flip-flop 74 to the "1" state and consequently, biasing off diode gate 44. The setting of flip-flop 74 to the "1" state results in a pulse being applied via a diode 94 to the set "0" line 96 of flip-flop 76 thus biasing on diode gate 46.

The pulse reaching the end of delay 116 exits at output 118 forming a first pulse of one pulse train. This pulse exiting delay 116 also is applied via "OR" gate 154 to the inhibit line 156 of "inhibited OR" gate 40.

If a third pulse enters at input 36 after a time interval from the entrance of the first pulse equal to twice the PRI of the pulse trains being sorted, it will be directly applied via "AND" gate 120 and "OR" gate 114 to the delay 116 bypassing the "inhibited OR" gate 40 which is being inhibited. This pulse will pass through delay 116 and become the second pulse of the pulse train exiting at output 118. Subsequent pulses forming a part of this repetitive train will also pass through "AND" gate 120, "OR" gate 114, delay 116 and exit the output 118.

The next pulse incident at input 36 which has a delay interval from the preceding pulse less than the PRI of the pulse trains will pass through "inhibited OR" gate 40 which is not now being inhibited, start down delay 42 and pass through diode gate 46 which had been set open by the setting of flip-flop 76 to the "0" state. This pulse will pass through "OR" gate 122 and start down delay 124. The pulse will exit delay 124 at the output 126 forming one pulse of a second sorted train.

The pulse exiting delay 124 will pass through "OR" gate 154 and inhibit "inhibited OR" gate 40 such that the third and subsequent pulses of this repetitive pulse train will pass directly from the input 36 via "AND" gate 128 and "OR" gate 122 to the input of delay 124 bypassing the delay 42 and diode gate 46.

In similar fashion, as previously described, the output from diode gate 46 will also pass through "OR" gate 56 to the set "1" line of flip-flop 76 and bias off diode gate 46. The setting of flip-flop 76 to the "1" state produces an output pulse which is applied via a diode 98 to the set "0" line 100 of flip-flop 78 and biases on diode gate 48.

As before, subsequent pulses not being a part of the repetitive pulse trains exiting the outputs 118 and 126 will cause further pulse train sorting at outputs 134, 142, and 152 with repetitive pulses of these further pulse trains inhibiting "inhibited OR" gate 40 and thus bypassing "inhibited OR" gate 40, delay 42 and the diode gates and passing to their respective outputs via their respective "AND" gates, "OR" gates and delays.

Although the circuit of FIG. 2 show only 5 outputs, it could be expanded to provide many more outputs by providing additional channels which comprise components similar to those represented by the first channel which includes diode gate 44, diode 84, flip-flop 74, diode 110, "OR" gate 54, "OR" gate 114, delay 116 and "AND" gate 120.

If delay 42 is to be any type of delay other than, for example, a monostable multivibrator, for example, a shift register or lumped delay, then the modification illustrated in FIG. 3 must be used. This modification comprises the addition of an "inhibited OR" gate 43. In this embodiment if a second pulse of a pulse train is wtihin delay 37 it will not pass to the diode gates, but will be inhibited by a signal on inhibit line 156 going to "inhibited OR" gate 43.

Alternatively the embodiment of FIG. 4 can be employed where a delay 47 is substituted for delay 42. Delay 47 has a delay time equal to the PRI minus the pulse width such that the output from delay 47 will cause "inhibited OR" gate to be inhibited and stop the next pulse of the pulse train, the output from delay 47 being applied to inhibit line 156 via a unidirectional device 45.

Figure 5:
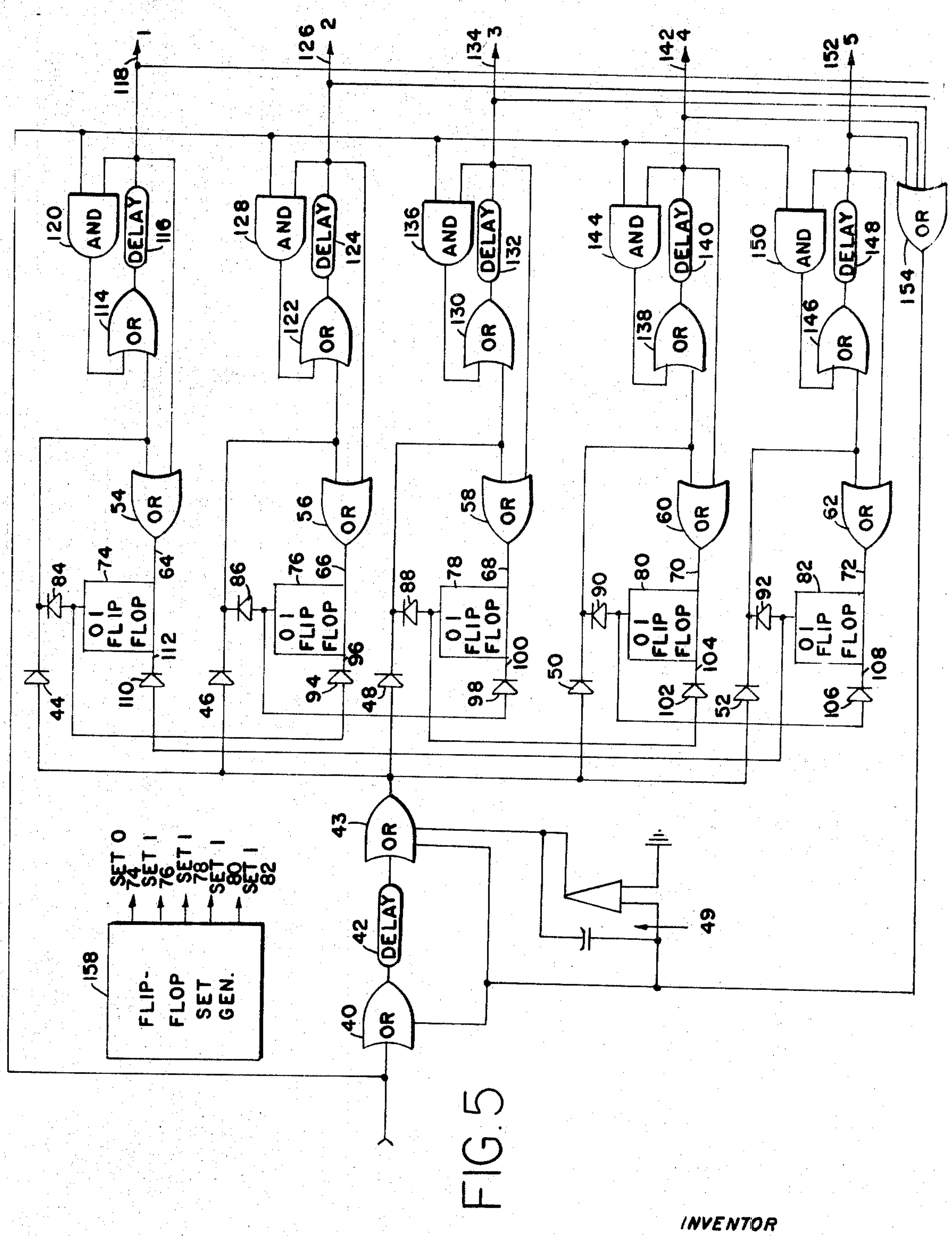

In the event that more pulse trains are present than the number of channels available the embodiment of FIG. 3 can be modified as illustrated in FIG. 5. The addition of integrator 49 inhibits "inhibited OR" gate 43. Integrator 49 is selected to provide an output when it receives a number of pulses equivalent to the number of channels employed within a PRI period; in the present example, five pulses. The integrator output inhibits "inhibited OR" gate 43 until the number of pulses received within a PRI falls below five.

Although flip-flops are illustrated as preferred devices other elements having bistable characteristics well-known to those skilled in the art could be employed. Likewise the use of diodes as the unidirectional devices is exemplary only. Hence, it is to be understood that the embodiment shown is to be regarded as illustrative only, and that many variations and modifications may be made without departing from the principles of the invention herein disclosed and defined by the appended claims.

I claim:

1. Apparatus for separating repetitive pulse trains having a common PRF, comprising:

- input means;
- a plurality of output means;
- an "inhibited OR" gate coupled to said input means;
- a delay means coupled to said "inhibited OR" gate; and
- means for selectively applying pulses from said input means to said output means in accordance with the time of arrival of said pulses at said input means, including a plurality of sorting channels, one sorting channel coupled between said delay means and each of said output means.

2. Apparatus as defined in claim 1 in which said delay means comprises a monostable multivibrator.

3. Apparatus as defined in claim 1, further including a second "inhibited OR" gate coupled from said delay means to said sorting channels.

4. Apparatus as defined in claim 1, further including a unidirectional device coupled from said delay means to the inhibit line of said "inhibited OR" gate.

5. Apparatus as defined in claim 1 in which said output means includes an "OR" gate and an output delay means.

6. Apparatus as defined in claim 1 in which said sorting channels each includes a bistable multivibrator; a diode gate coupled to said delay means; a unidirectional device coupling said diode gate and the output of said bistable multivibrator, said unidirectional device also coupled to another of said sorting channels; an "OR" gate having first and second inputs and an output, said first input to said "OR" gate coupled to said diode gate, said second input to said "OR" gate coupled to one of said output means, and said output of said "OR" gate coupled to the set "1" input of said bistable multivibrator; and a unidirectional device coupling the set "0" line of said bistable multivibrator and the output of one bistable multivibrator in one of said other sorting channels.

7. Apparatus as defined in claim 6 in which the output from each of said diode gates is coupled to one of said output means.

8. Apparatus as defined in claim 1, further including a plurality of bypassing means, one coupling said input means to each of said output means bypassing said sorting channels.

9. Apparatus as defined in claim 8 in which each of said bypassing means includes an "AND" gate coupling said input means to said output means.

10. Apparatus as defined in claim 6 further including means for setting one of said bistable multivibrators to its "0" state and the rest of said bistable multivibrators to their "1" state.

11. Apparatus as defined in claim 3, further including means for inhibiting said second "inhibited OR" gate upon the reception at said input means of a number of pulses equivalent to the number of said plurality of channels arriving within one PRI period.

12. Apparatus as defined in claim 11 in which said means for inhibiting includes an integrator coupled to said output means.

13. Apparatus for separting repetitive pulse trains having a common PRF, comprising:

- input means for receiving a plurality of pulse trains having a common PRF;
- a plurality of output means;
- first means coupled to said input means for coupling a first received pulse of a first pulse train to a first of said output means and for coupling first pulses of other pulse trains received within one PRI (1/PRF) from time of reception of any pulse of said first pulse train to others of said output means; and
- second means coupled to said input means for coupling other pulses of the pulse trains to their respective output means.

14. Apparatus as defined in claim 3 in which said second coupling means couples only third and subsequent pulses of the pulse trains to their respective output means.

References Cited

UNITED STATES PATENTS

| | | | |
|---|---|---|---|
| 2,834,833 | 5/1958 | Seggrstrom et al. | 328—153X |
| 2,845,530 | 7/1958 | Wade | 328—105 |
| 3,050,713 | 8/1962 | Harmon | 307—244X |
| 3,437,940 | 4/1969 | Tarczy-Hornoch | 307—233X |
| 3,439,281 | 4/1969 | McGuire et al. | 328—153 |
| 3,452,284 | 6/1969 | Koehler | 328—105 |

STANLEY D. MILLER, Jr., Primary Examiner

U.S. Cl. X.R.

307—232; 328—109, 110, 153